(12) United States Patent
Prince et al.

(10) Patent No.: US 10,099,162 B2
(45) Date of Patent: Oct. 16, 2018

(54) FILTER CARTRIDGE

(71) Applicant: Haier US Appliance Solutions, Inc., Wilmington, DE (US)

(72) Inventors: Ryan John Prince, Louisville, KY (US); Wade Antoine Powell, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 115 days.

(21) Appl. No.: 15/252,296

(22) Filed: Aug. 31, 2016

(65) Prior Publication Data

US 2018/0056216 A1    Mar. 1, 2018

(51) Int. Cl.
| | |
|---|---|
| *B01D 35/30* | (2006.01) |
| *B01D 35/143* | (2006.01) |
| *B01D 35/153* | (2006.01) |
| *C02F 1/28* | (2006.01) |
| *F25D 23/12* | (2006.01) |

(52) U.S. Cl.
CPC .......... *B01D 35/30* (2013.01); *B01D 35/143* (2013.01); *B01D 35/153* (2013.01); *C02F 1/283* (2013.01); *F25D 23/126* (2013.01); *B01D 2201/56* (2013.01); *C02F 2307/12* (2013.01); *F25D 2323/121* (2013.01)

(58) Field of Classification Search
None
See application file for complete search history.

(56) References Cited

U.S. PATENT DOCUMENTS

| | | | |
|---|---|---|---|
| 6,632,355 B2 | 10/2003 | Fritze | |
| 7,506,666 B2 | 3/2009 | Tubby et al. | |
| 8,177,973 B2 | 5/2012 | Kennedy et al. | |
| 8,182,699 B2 | 5/2012 | Fritze | |
| 9,011,686 B2 | 4/2015 | Kirchner et al. | |
| 2009/0289000 A1* | 11/2009 | Kim ...................... | B01D 35/30 210/137 |
| 2012/0279916 A1* | 11/2012 | Kirchner .............. | B01D 35/153 210/232 |
| 2014/0110331 A1* | 4/2014 | Baird ................... | B01D 35/153 210/346 |
| 2014/0166556 A1* | 6/2014 | Williams ............. | B01D 35/147 210/136 |

\* cited by examiner

*Primary Examiner* — Benjamin M Kurtz
(74) *Attorney, Agent, or Firm* — Dority & Manning, P.A.

(57) ABSTRACT

A filter cartridge includes a casing. A filter medium is disposed within the casing, and a sleeve is disposed within a port of the casing. The filter cartridge also includes features, such as an annular ring or a flow restriction body, for limiting spillage of water from the filter cartridge.

19 Claims, 11 Drawing Sheets

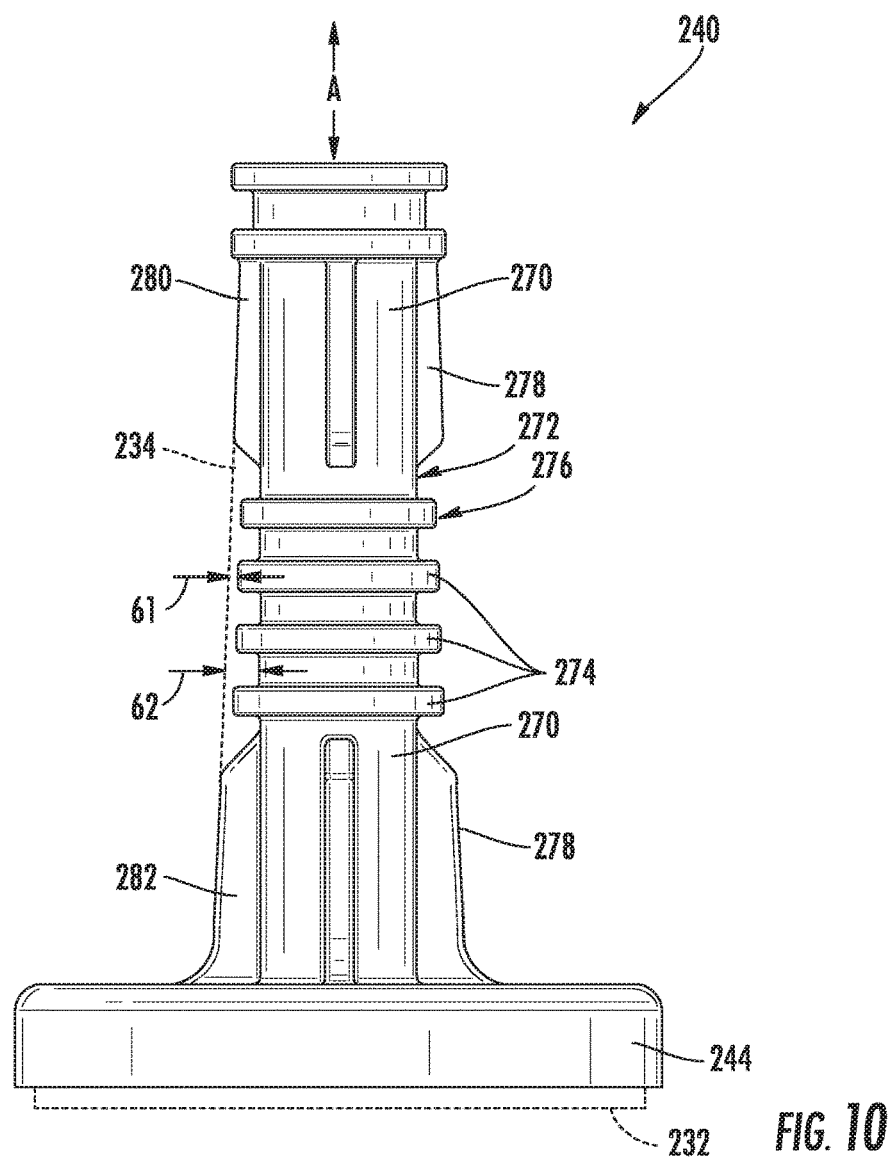
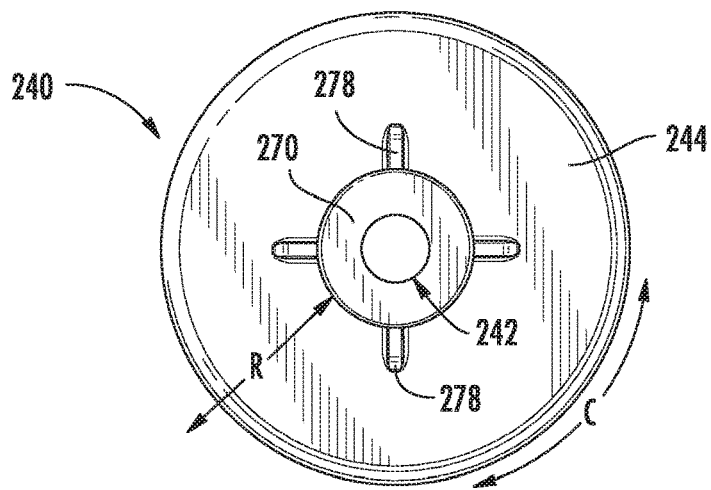
FIG. 10
FIG. 11

FILTER CARTRIDGE

FIELD OF THE INVENTION

The present subject matter relates generally to filter cartridges, such as filter cartridges for refrigerator appliances.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In order to filter water, water filters are generally provided with a filtering media such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, the filtering capacity of the filtering media can decrease over time due to pores becoming clogged or pore surfaces become saturated with contaminates. Also, conditions within the filtering media can provide for large scale bacteria growth, particularly over time. For example, bacteria can start to grow within the carbon block given the right water conditions and sufficient time.

To hinder such bacteria growth and insure that the filtering media has not exceeded its filtering capacity, the water filter is preferably replaced or serviced about every six months regardless of its current performance. However, changing the water filter can be a messy and time consuming task. For example, when the water filter is removed it is filled with water, and such water can spill if the water filter is tipped or tilted during removal. However, tipping or tilting certain water filters can be required in order to remove certain water filters due to their location. Such spills can be time consuming and inconvenient to clean. Thus, certain consumers only replace the water filter after it has become blocked, e.g., by sediment accumulation around and within the carbon block.

Accordingly, a water filter with features for hindering spilling of water contained within the water filter during removal or replacement of the water filter would be useful.

BRIEF DESCRIPTION OF THE INVENTION

The present subject matter provides a filter cartridge that includes a casing. A filter medium is disposed within the casing, and a sleeve is disposed within a port of the casing. The filter cartridge also includes features, such as an annular ring or a flow restriction body, for limiting spillage of water from the filter cartridge. Additional aspects and advantages of the invention will be set forth in part in the following description, or may be apparent from the description, or may be learned through practice of the invention.

In a first exemplary embodiment, a filter cartridge is provided. The filter cartridge includes a casing that extends between a first end portion and a second end portion along an axial direction. The casing has a port positioned at the first end portion of the casing. A filter medium is disposed within the casing. A sleeve is disposed within the port of the casing. The sleeve includes a post and an annular ring. The annular ring of the sleeve extends from the post of the sleeve along a radial direction that is perpendicular to the axial direction. An outer surface of the annular ring spaced apart from an inner surface of the casing along the radial direction by a first gap. An outer surface of the post adjacent the annular ring is spaced apart from the inner surface of the casing along the radial direction by a second gap. The first gap is smaller than the second gap.

In a second exemplary embodiment, a filter cartridge is provided. The filter cartridge includes a casing that extends between a first end portion and a second end portion along an axial direction. The casing has a port positioned at the first end portion of the casing. A filter medium is disposed within the casing. A sleeve is disposed within the port of the casing. The sleeve includes a post and a cap. The cap is positioned on the filter medium within the casing. The post of the sleeve extends along the axial direction from the cap of the sleeve. An annular ring is disposed within the port of the casing. The annular ring extends along a radial direction that is perpendicular to the axial direction. An outer surface of the annular ring is spaced apart from an inner surface of the casing or an outer surface of the post along the radial direction by a gap. The gap is no greater than fifty thousandths of an inch.

In a third exemplary embodiment, a filter cartridge is provided. The filter cartridge includes a casing that extends between a first end portion and a second end portion along an axial direction. The casing has a port positioned at the first end portion of the casing. A filter medium is disposed within the casing. A sleeve is disposed within the port of the casing. The sleeve includes a post and a cap. The cap is positioned on the filter medium within the casing. The post of the sleeve extends along the axial direction from the cap of the sleeve. The post of the sleeve defines a passage that extends within the post along the axial direction. A flow restriction body is positioned within the passage of the post. The flow restriction body extends across the passage of the post and defines at least one hole for directing fluid through the flow restriction body. Each hole of the at least one hole has a width along a radial direction that is perpendicular to the axial direction. The width of each hole of the at least one hole is no greater than fifty thousandths of an inch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 provides an elevation view of a sleeve of the exemplary filter cartridge of FIG. 9.

FIG. 11 provides a top, plan view of the sleeve of FIG. 10.

DETAILED DESCRIPTION

Figure 1:
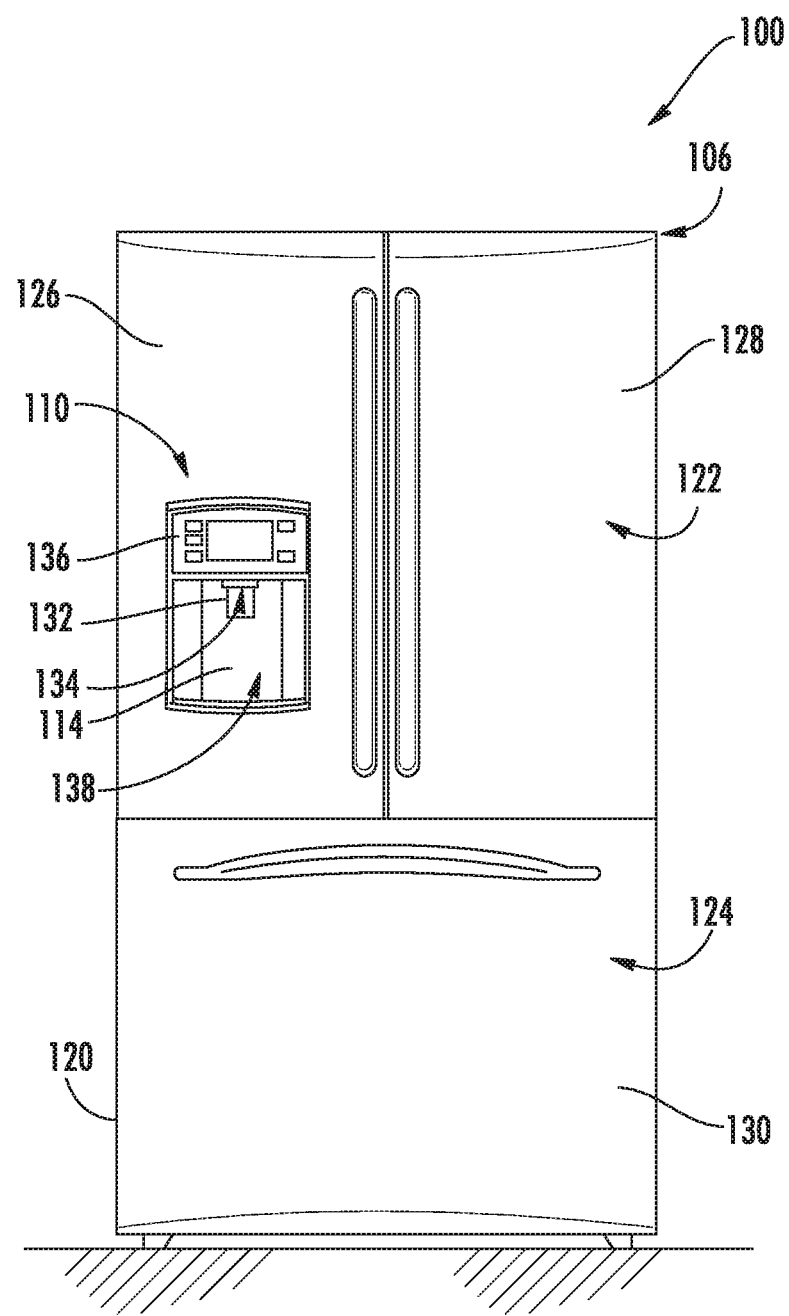
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, it will be understand that the present subject matter can be used with other types of refrigerators (e.g., side-by-sides top mount). Thus, the description set forth herein is provided by way of example only and is not intended to limit the present subject matter to any particular arrangement or placement within an appliance.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

Figure 2:
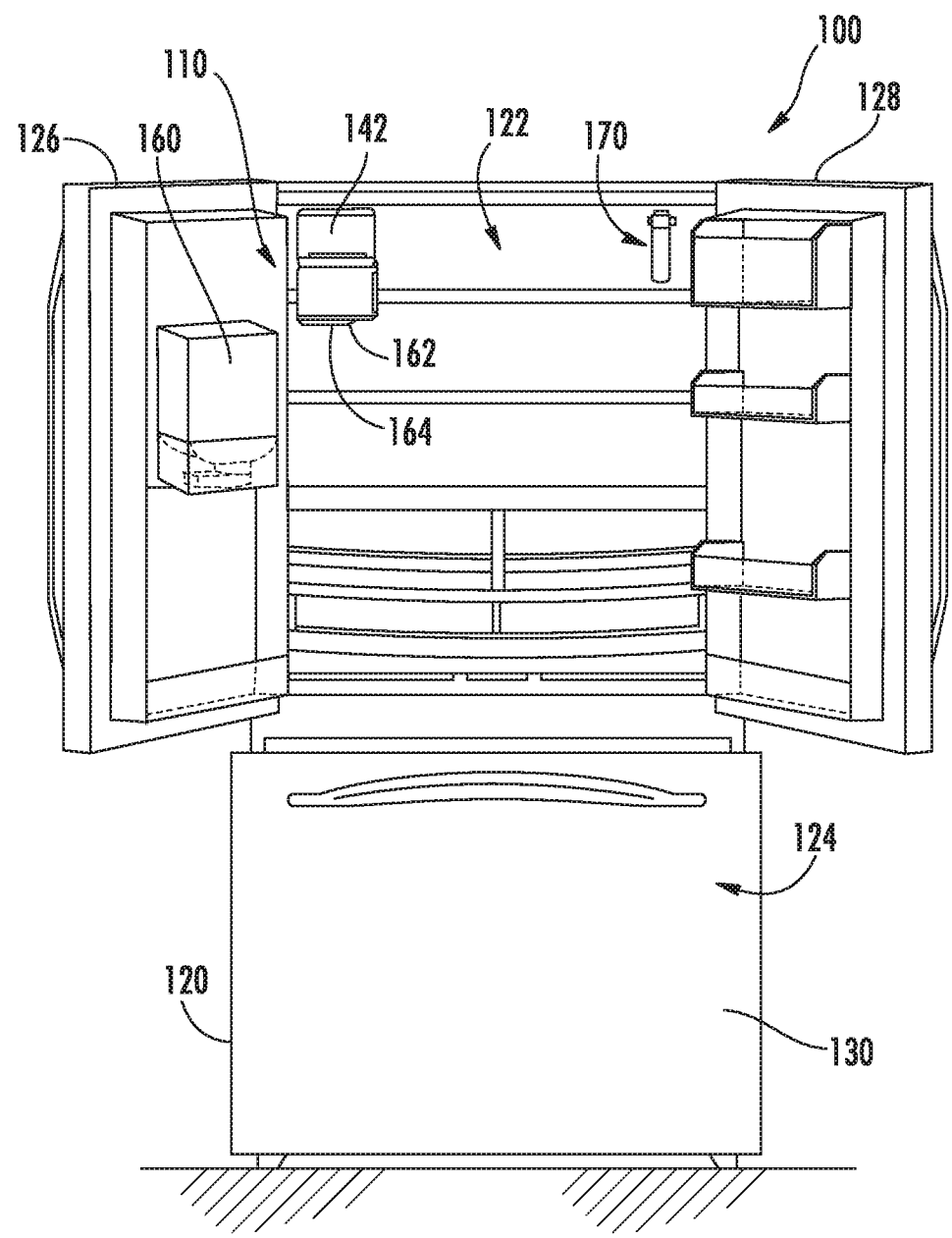
FIG. 2 provides a front, elevation view of the refrigerator appliance of FIG. 1 with refrigerator doors of the refrigerator appliance shown in an open configuration to reveal a fresh food chamber of the refrigerator appliance.

FIG. 2 is a perspective view of refrigerator appliance 100 having refrigerator doors 126, 128 in an open position to reveal the interior of fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

Operation of the refrigerator appliance 100 is regulated by a controller (not shown) that is operatively coupled to user interface panel 136 and/or activation member 132 (shown in FIG. 1). Panel 136 provides selections for user manipulation of the operation of refrigerator appliance 100 such as e.g., selections between whole or crushed ice, chilled water, and/or other options as well. In response to user manipulation of the user interface panel 136, the controller operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout refrigerator appliance 100. For example, the controller may be located within beneath the user interface panel 136 on door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller via one or more signal lines or shared communication busses.

Refrigerator appliance 100 also includes a water filtering assembly 170 for filtering water coming into refrigerator appliance 100 from a water supply (not shown), such as a municipal water source or a well. Water filtering assembly 170 can remove contaminants, such as chlorine, chloroform, lead, arsenic, pharmaceuticals, microbes, etc., from water supplied to refrigerator appliance 100. In particular, water filtering assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics and other chemical compounds or substances.

Figure 3:
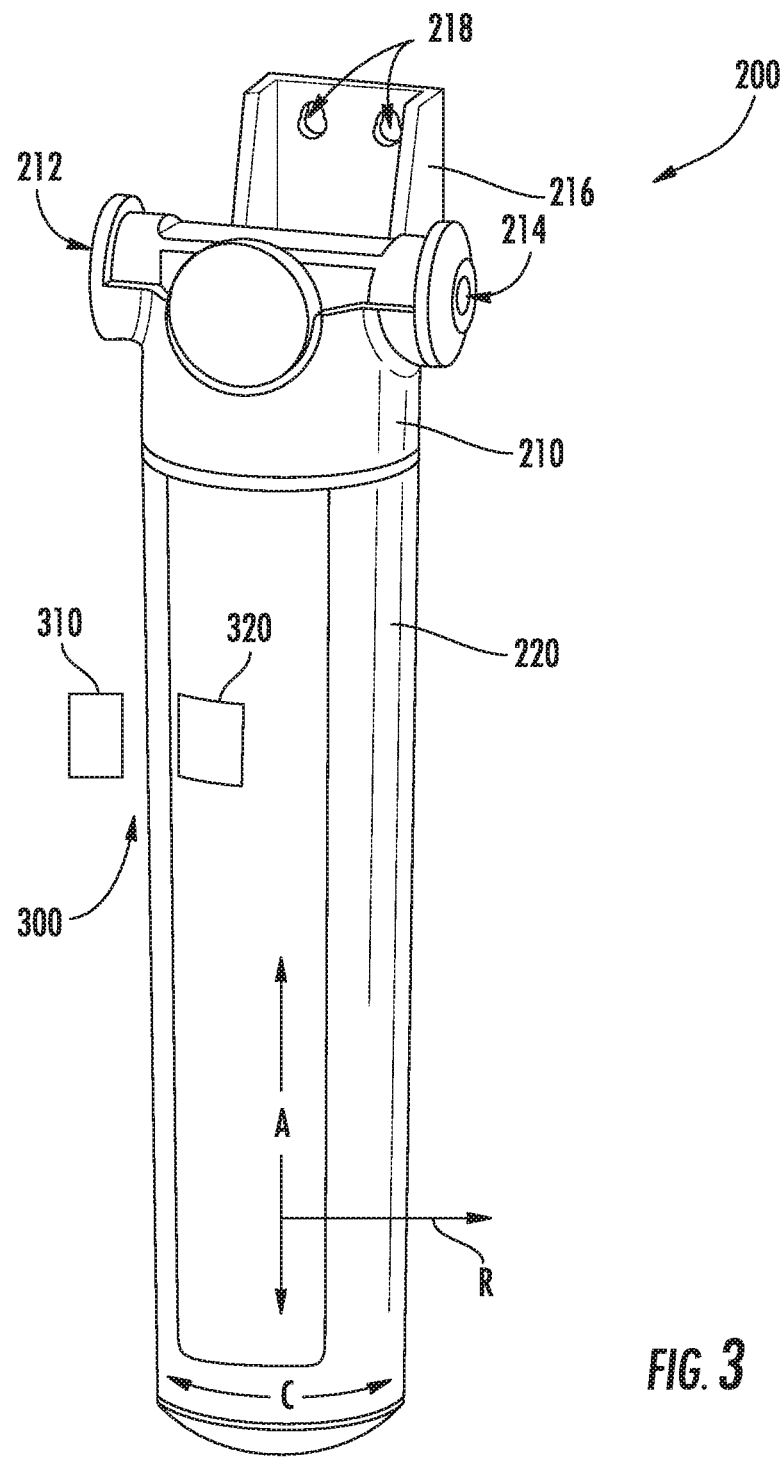
FIG. 3 provides a perspective view of a water filtering assembly according to an exemplary embodiment of the present subject matter.

FIG. 3 provides a perspective view of a water filtering assembly 200 according to an exemplary embodiment of the present subject matter. Water filtering assembly 200 may be used in the refrigerator appliance 100, e.g., as water filtering assembly 170 (FIG. 2). In alternative exemplary embodiments, water filtering assembly 200 may be used in any other suitable appliance, such as an ice maker, as a point of use water filtration system, e.g., installed beneath a sink, or as a point of entry water filtration system for an entire household. Thus, the present subject matter is not limited to any particular installation or location for water filtering assembly 200.

Water filtering assembly 200 defines an axial direction A, a radial direction R, and a circumferential direction C. Water filtering assembly 200 also includes a manifold 210 and a filter cartridge 220 removably mounted to manifold 210. Manifold 210 includes a mounting bracket 216 that defines holes 218. Fasteners (not shown), such as nails, pegs, tabs, screws, or bolts, may be inserted through holes 218 to mount water filtering system 200, e.g., to housing 120 of refrigerator appliance 100 (FIG. 2), to a kitchen cabinet beneath a kitchen sink, or to a wall within a house. Manifold 210 also defines an entrance 212 and an exit 214. Entrance 212 may be in fluid communication with a water supply and receive unfiltered water from the water supply. From entrance 212, such unfiltered water is directed into filter cartridge 220. Such unfiltered water passes through filter cartridge 220 and exits manifold 210 at exit 214 as filtered water. Such filtered water may, e.g., be directed to the ice maker within insulated housing 142 (FIG. 2), discharging outlet 134 (FIG. 2), a kitchen sink faucet, and/or any other suitable use.

Figure 4:
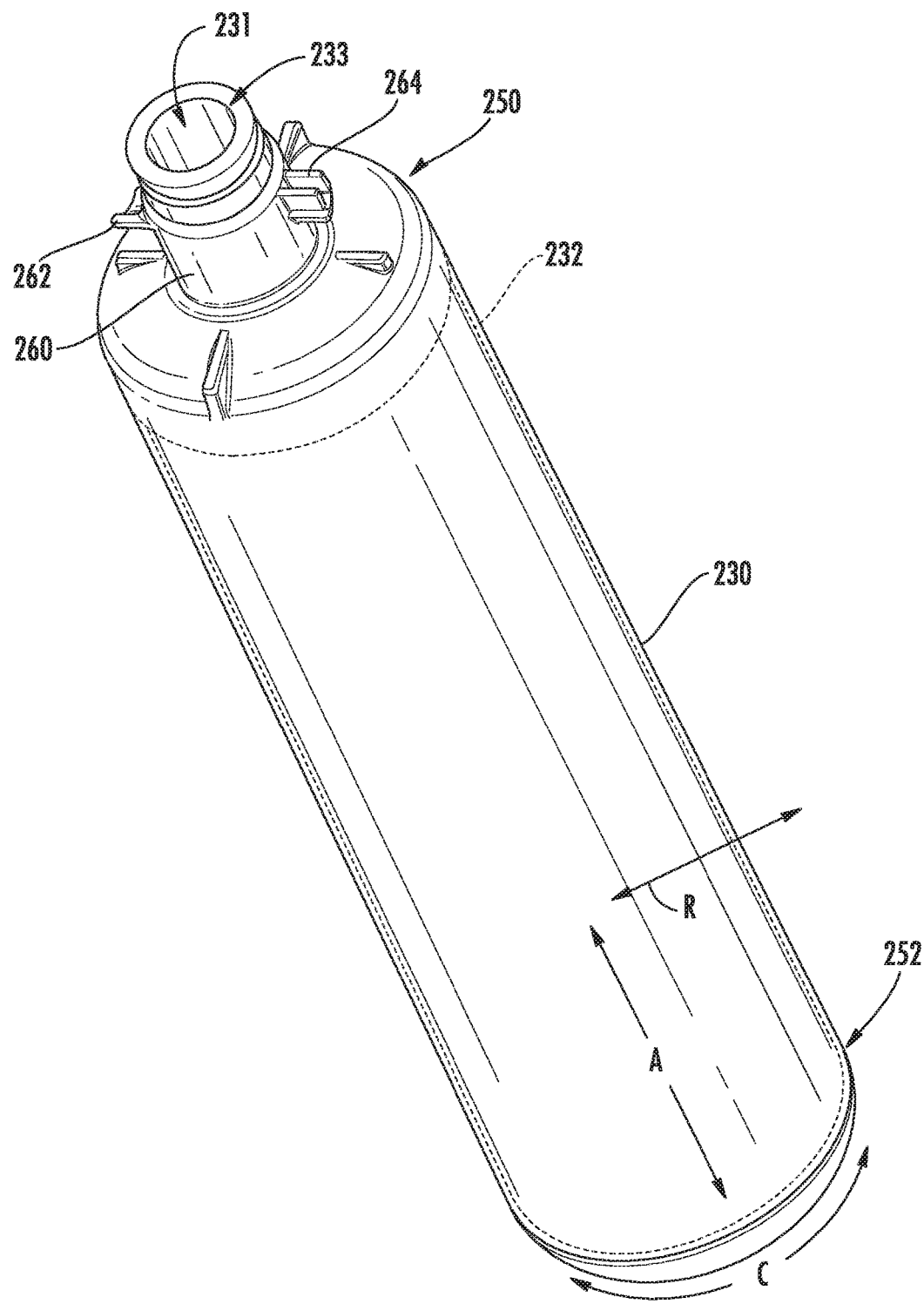
FIG. 4 provides a perspective view of a housing for a filter cartridge according to an exemplary embodiment of the present subject matter.

FIG. 4 provides a perspective view of various components of filter cartridge 220. Filter cartridge 220 includes a casing, sheath or housing 230 that defines a chamber 231. Housing 230, e.g., an annular sidewall of housing 230, extends between a top portion 250 and a bottom portion 252, e.g., along the axial direction A. Housing 230 also defines an opening 233 at top portion 250 of housing 230. Opening 233 permits access to chamber 231 of housing 230. Housing 230 may have only one opening 233 through housing 230 to chamber 231, in certain exemplary embodiments, e.g., such that all fluid flow into and out of chamber 231 passes through opening 233.

Figure 9:
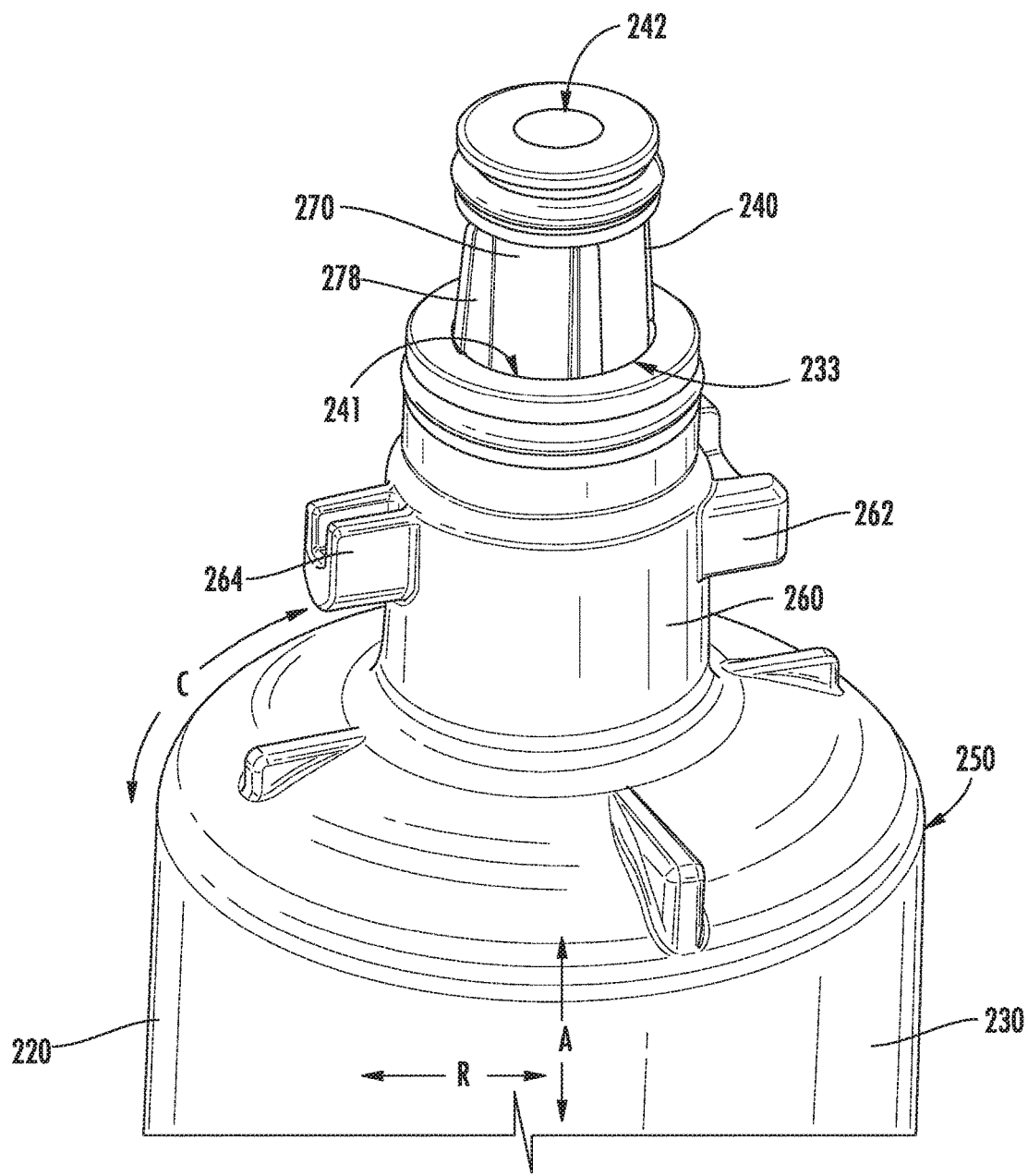
FIG. 9 provides a partial, perspective view of a neck of a filter cartridge according to an exemplary embodiment of the present subject matter.

FIG. 9 provides a partial, perspective view of a port or neck 260 of housing 230, e.g., at top portion 250 of housing 230. Opening 233 may be positioned at or defined at neck 260 of housing 230. As shown in FIG. 9, a sleeve 240 may be received within opening 233 at neck 260. Sleeve 240 assists with dividing opening 233 and with defining a first passage or inlet 241 and a second passage or outlet 242 of filter cartridge 220. Inlet 241 is in fluid communication with entrance 212 of manifold 210 and with chamber 231 of housing 230. Thus, unfiltered water can enter chamber 231 of housing 230 through inlet 241. Outlet 242 is in fluid communication with exit 214 of manifold 210 and chamber 231 of housing 230. Thus, filtered water can exit chamber 231 of housing 230 through outlet 242.

With reference to FIGS. 4, 9 and 10, a filtering medium 232 is disposed within chamber 231. Filtering medium 232 is spaced apart from an inner surface 234 of housing 230, e.g., along the radial direction R, within chamber 231. In particular, a cap 244 of sleeve 240 may be positioned within chamber 231 on filtering medium 232 at top portion 250 of housing 230 in order to define a radial gap between inner surface 234 of housing 230 and an outer surface of filtering medium 232. As an example, cap 244 may be glued or in some other manner fixed to filtering medium 232 in order to define the radial gap, position filtering medium 232 vertically, and block potential bypass flow around filtering medium 232 to outlet 242.

Filtering medium 232 also divides chamber 231 into an unfiltered volume and a filtered volume. Filtering medium 232 can remove impurities and contaminants from water passing through filtering medium 232 from the unfiltered volume to the filtered volume. Filtering medium 232 may include any suitable mechanism for filtering water such as, e.g., ceramic filters, activated carbon filters, polymer filters, or reverse osmosis filters. As used herein, the term "unfiltered" describes a volume within chamber 231 that is not filtered relative to filtering medium 232. However, it will be understood that water filtering assembly 200 may include additional filters that filter water entering chamber 231. Thus, "unfiltered volume" may be filtered relative to other filters but not filtering medium 232.

As an example, water passing through water filtering assembly 200 can follow a path through water filtering assembly 200. In particular, unfiltered water can enter water filtering assembly 200 through entrance 212 of manifold 210. Such unfiltered water can then flow through inlet 241 into the unfiltered volume of chamber 231. Such unfiltered water can pass through filtering medium 232 to remove impurities and can exit filtering medium 232 into the filtered volume of chamber 231 as filtered water. Such filtered water can then pass through outlet 242 and exit water filtering assembly 200 through exit 214 of manifold 210.

In such a manner, unfiltered water can follow the path through water filtering assembly 200. In particular, unfiltered water can pass through filtering medium 232, and filtered water can exit water filtering assembly 200. Such filtering can improve taste and/or safety of water. However, effectiveness of filtering medium 232 can decrease over time. In particular, bacteria can accumulate or grow within filtering medium 232 over time. Thus, filtering medium 232 and/or filter cartridge 220 may require replacement or servicing after a certain time interval in order to maintain proper operation of water filtering assembly 200. In particular, filtering medium 232 and/or filter cartridge 220 may require replacement or servicing about every six months. As an example, manifold 210 and filter cartridge 220 may be constructed such that water flow through manifold 210 from entrance 212 of manifold 210 is obstructed when filter cartridge 220 is removed from manifold 210. In particular, manifold 210 may include a rotatable valve body 219 (FIG. 8) that actuates open and closed through rotation of filter cartridge 220 relative to manifold 210. Rotatable valve bodies are well known to those skilled in the art and operation of such valves is not described herein with great detail.

Water filter assembly 200 can be exposed to a variety of conditions within that can negatively affect performance of water filter assembly 200. For example, high water pressure at inlet 212 of manifold 210 or exposing water filter assembly 200 to freezing conditions can negatively affect performance of water filter assembly 200. Such conditions can cause water filter assembly 200 to leak, e.g., at a connection between filter cartridge 220 and manifold 210. Such conditions can also cause water filter assembly 200 to deform or crack. As discussed in greater detail below, water filter assembly 200 includes features for detecting such malfunctions of water filter assembly 200.

As may be seen in FIG. 3, water filter assembly 200 includes a system 300 for detecting liquid water. System 300 includes a radio frequency identification reader or RFID reader 310 (shown schematically) and a radio frequency identification tag or RFID tag 320. RFID reader 310 is configured for receiving a signal from RFID tag 320. Thus, RFID reader 310 and RFID tag 320 can be in signal communication with each other as will be understood by those skilled in the art. For example, RFID reader 310 and RFID tag 320 may be in signal communication with each other and/or be operate in the manner described in U.S. Patent Publication No. 2015/0290567 of Chernov et al., U.S. Pat. No. 9,366,388 of Krause et al. or U.S. Pat. No. 9,274,020 of Chernov et al., all of which are incorporated by reference in their entirety.

In certain exemplary embodiments, RFID tag 320 is a passive RFID tag. Thus, RFID reader 310 can receive a radio signal from RFID tag 320 in response to a query or request signal from RFID reader 310. In particular, RFID tag 320 can generate or transmit the response radio signal utilizing energy transmitted, e.g., wirelessly, to RFID tag 320 from RFID reader 310 via the query or request signal from RFID reader 310. Thus, RFID tag 320 need not include a battery or other power source in order to generate or transmit the response radio signal. In other exemplary embodiments, RFID tag 320 is an active RFID tag and includes a battery or is connected to a suitable power source. Thus, RFID tag 320 can continuously or intermittently generate or transmit a signal that RFID reader 310 can receive. As will be understood by those skilled in the art, RFID reader 310 and RFID tag 320 can have any other suitable setup or configuration for placing RFID reader 310 and RFID tag 320 in signal communication with each other. Thus, RFID reader 310 may be passive or active, and RFID tag 320 may be passive or active depending upon the desired setup of system 300.

Signal communication between RFID reader 310 and RFID tag 320 is affected by a variety of factors. For example, signal communication between RFID reader 310 and RFID tag 320 can be limited or terminated if a gap between RFID reader 310 and RFID tag 320 is increased. RFID reader 310 and RFID tag 320 can also be tuned such that signal communication between RFID reader 310 and RFID tag 320 is established with a particular transmission medium, such as air, disposed between RFID reader 310 and RFID tag 320, e.g., within the gap between RFID reader 310 and RFID tag 320. Thus, the signal communication between RFID reader 310 and RFID tag 320 can be disrupted or terminated if the transmission medium changes and another material is positioned between RFID reader 310 and RFID tag 320. For example, if water is positioned between RFID reader 310 and RFID tag 320, the signal communication between RFID reader 310 and RFID tag 320 can be terminated or disrupted. In particular, liquid water can absorb radio waves and thereby terminate or disrupt signal communication between RFID reader 310 and RFID tag 320. Liquid water can also affect transmission and reception of radio waves by antennas of RFID reader 310 and/or RFID tag 320. As discussed in greater detail below, when signal communication between RFID reader 310 and RFID tag 320 is disrupted, lost or terminated, it can be inferred that liquid water is disposed between RFID reader 310 and RFID tag 320 (e.g., that liquid water is disposed within the gap between RFID reader 310 and RFID tag 320). For example, when signal communication between RFID reader 310 and RFID tag 320 is interrupted, it can be inferred that water filter assembly 200 is leaking or otherwise malfunctioning.

Water filter assembly 200 includes features for facilitating signal communication between RFID reader 310 and RFID tag 320. In particular, water filter assembly 200 includes features for orienting filter cartridge 220 on manifold 210 such that RFID tag 320 is positioned adjacent and/or faces RFID reader 310. Such features may orient housing 230 in only a single orientation in which RFID tag 320 is positioned proximate RFID reader 310 when filter cartridge 220 is mounted to manifold 210. Thus, filter cartridge 220 may engage and be mounted to manifold 210 in only a single orientation of filter cartridge 220 in certain exemplary embodiments.

It will be understood that an RFID tag on a filter cartridge could be positioned remotely or face away from an associated RFID reader if the filter cartridge has a current bilaterally or axially symmetric design. In particular, the current bilaterally or axially symmetric design of filter cartridges allows the filter cartridge to be mounted to a manifold in multiple orientation, and an RFID tag on the filter cartridge could be positioned remotely or face away from an associated RFID reader in one orientation while the RFID tag is positioned proximate and/or faces the RFID reader in another orientation. Signal communication between the RFID tag and the RFID reader may be hindered in the orientation in which the RFID tag is positioned remotely or faces away from the RFID reader, e.g., leading to false or incorrect water leakage warnings. By limiting orientation of filter cartridge 220 on manifold 210 such that RFID tag 320 is positioned adjacent and/or faces RFID reader 310, proper operation of system 300 may be facilitated relative to current bilaterally or axially symmetric filter cartridge designs that rely upon a user correctly orienting the filter cartridge.

To facilitate orientation of housing 230 in only a single orientation, e.g., in which RFID tag 320 is positioned proximate RFID reader 310, when filter cartridge 220 is mounted to manifold 210, filter cartridge 220 includes at least one lug mounted to housing 230. In the exemplary embodiment shown in FIGS. 4 through 7, filter cartridge 220 includes a first lug 262 and a second lug 264. First and second lugs 262, 264 are mounted to housing 230, e.g., at neck 260. First and second lugs 262, 264 also extend from housing 230, e.g., along the radial direction R. Thus, distal ends of first and second lugs 262, 264 may be spaced apart from neck 260 along the radial direction R.

First and second lugs 262, 264 may be formed separately from housing 230 and then adhered, fastened, welded, etc. to housing 230 in certain exemplary embodiments. In other exemplary embodiments, first and second lugs 262, 264 may be integrally formed with housing 230. For example, first and second lugs 262, 264 and housing 230 may be formed from a common material, such as injection molded or additively formed plastic. Thus, housing 230 and first and second lugs 262, 264 may be formed from a seamless one-piece material in exemplary embodiments.

Figure 8:
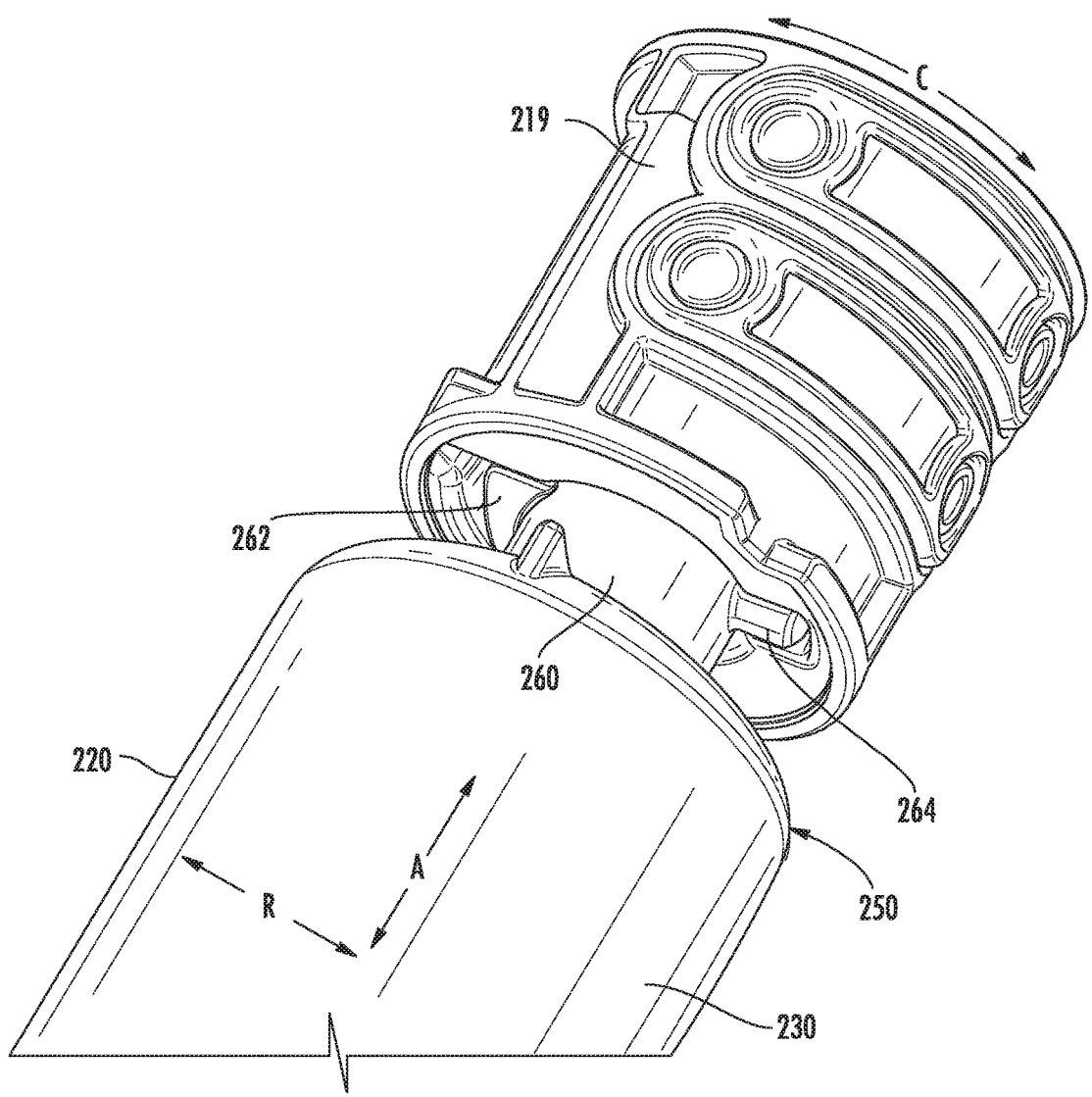
FIG. 8 provides a partial, perspective view of the exemplary housing of FIG. 4 coupled to a valve body of a manifold.

The at least one lug may be sized, positioned and/or oriented on housing 230 to facilitate orientation of housing 230 in only the single orientation when filter cartridge 220 is mounted to manifold 210. FIG. 8 provides a partial, perspective view of housing 230 coupled to a valve body 219 of manifold 210. As may be seen in FIG. 8, first and second lugs 262, 264 are received within valve body 219 of manifold 210 when filter cartridge 220 is mounted to manifold 210. In particular, valve body 219 defines recesses (not labeled) that are each sized and shaped to receive a respective one of first and second lugs 262, 264. Thus, valve body 219 may be keyed to receive first and second lugs 262, 264, and RFID tag 320 may be properly positioned relative to RFID reader 310 when filter cartridge 220 is mounted to manifold 210 due to the number, size, position and/or orientation of the at least one lug on housing 230.

Figure 5:
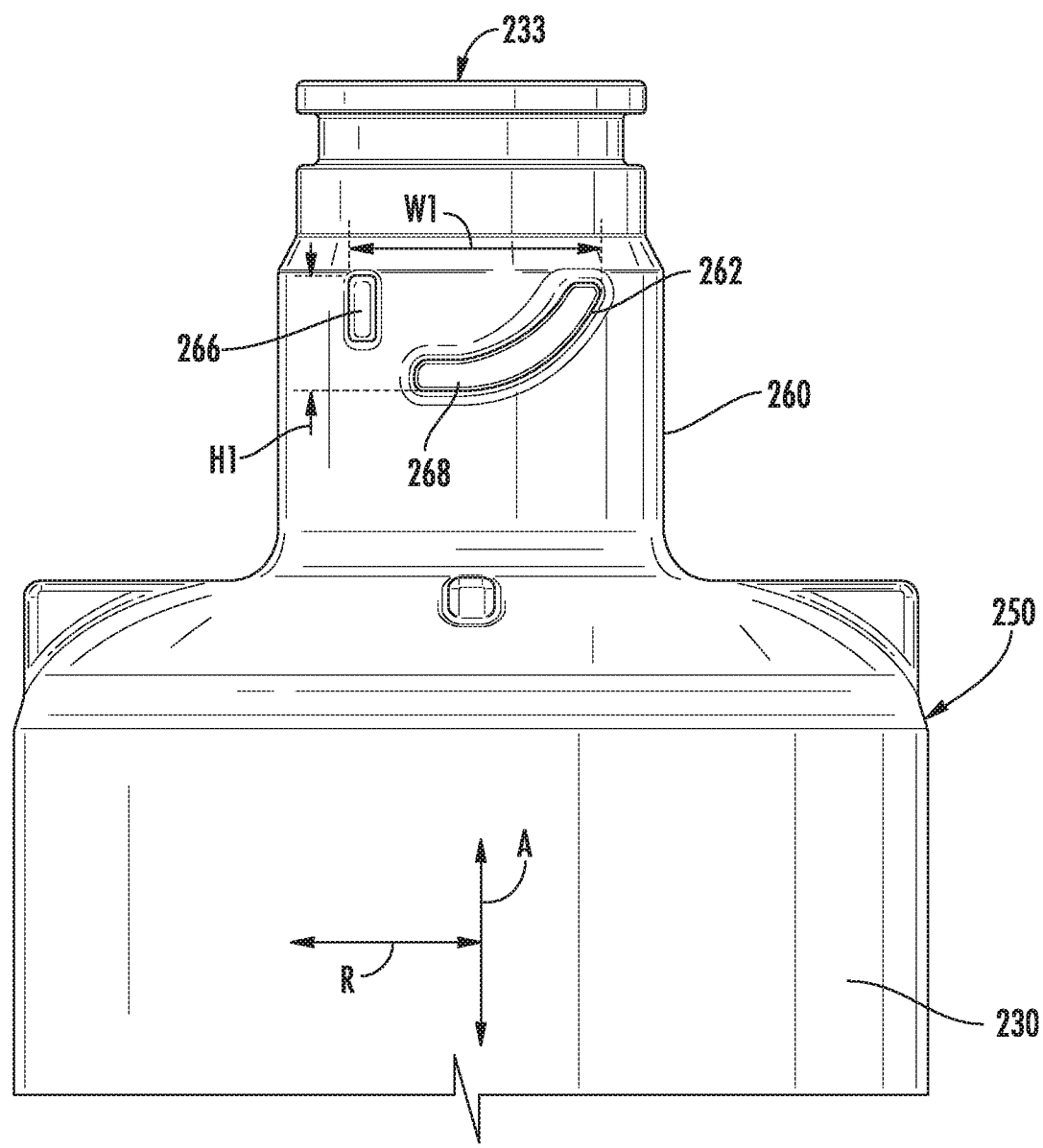
FIG. 5 provides a partial, elevation view of a first lug of the exemplary housing of FIG. 4.
Figure 6:
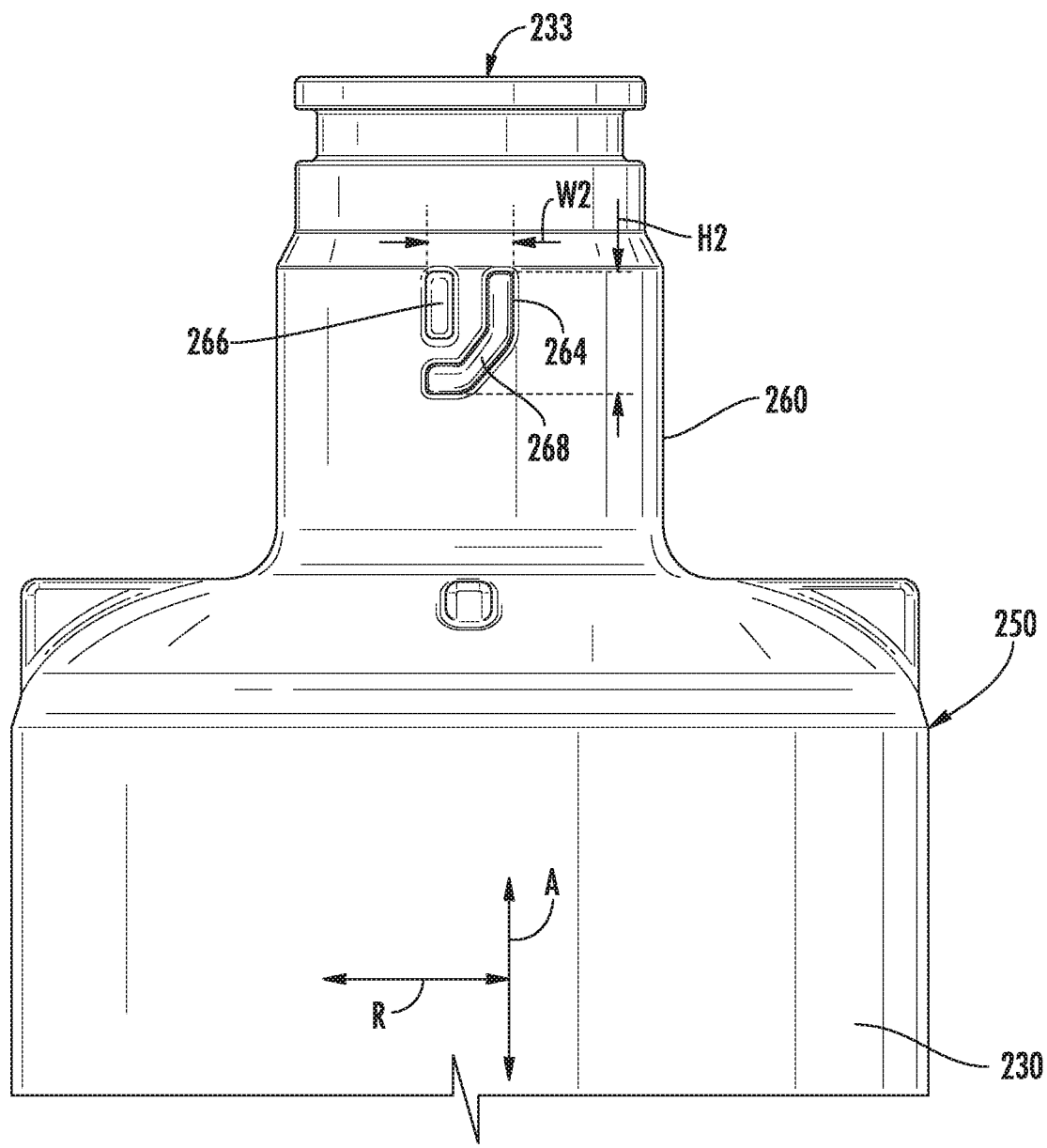
FIG. 6 provides a partial, elevation view of a second lug of the exemplary housing of FIG. 4.
Figure 7:
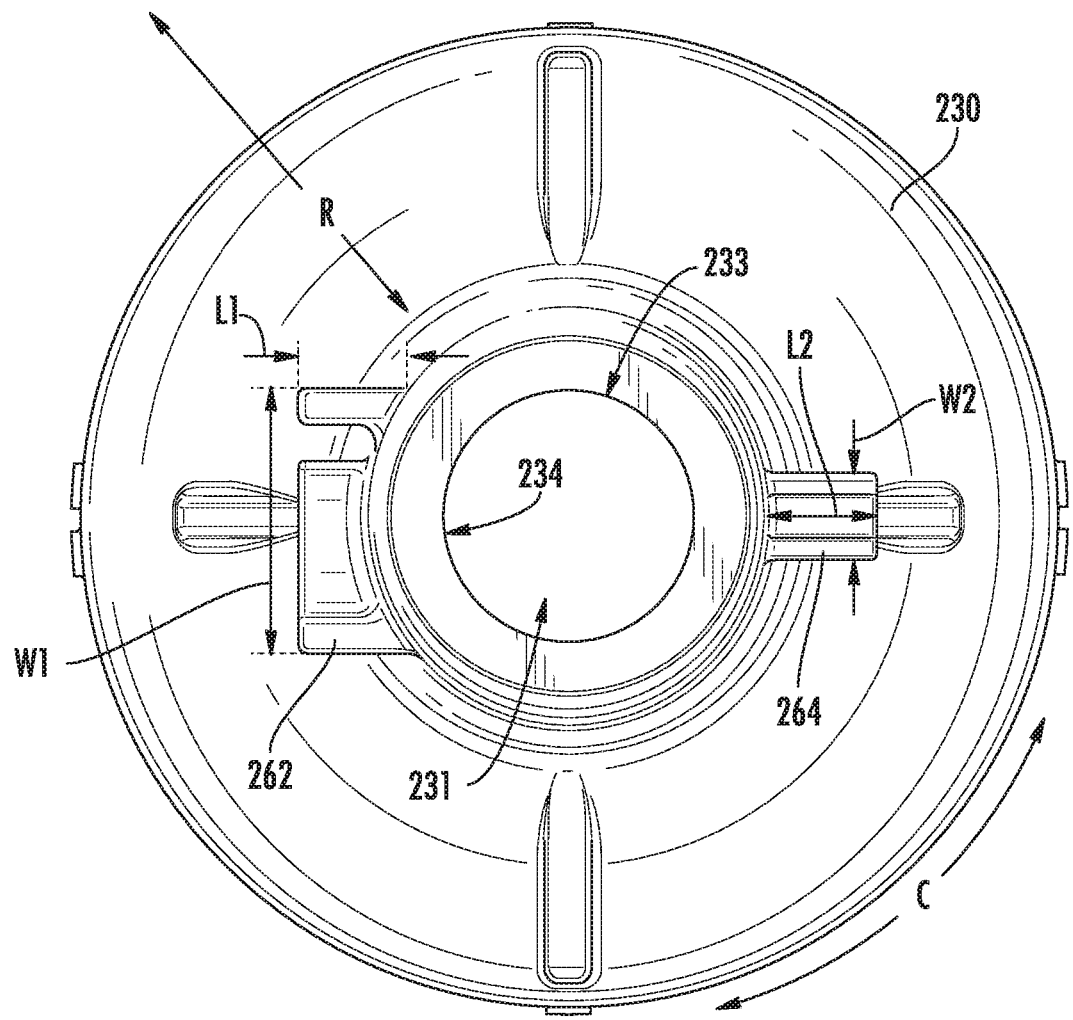
FIG. 7 provides a top, plan view of the exemplary housing of FIG. 4.

As an example, as may be seen in FIGS. 5 through 7, first lug 262 has a cross-sectional shape in a plane that is perpendicular to the radial direction R. Similarly, the second lug 264 has a cross-sectional shape in a plane that is perpendicular to the radial direction R. The cross-sectional shape of first lug 262 is different than the cross-sectional shape of second lug 264. Differences between the respective cross-sectional shapes of first and second lugs 262, 264 facilitates orientation of housing 230 in only the single orientation when filter cartridge 220 is mounted to manifold 210.

The cross-sectional shape of first lug 262 and the cross-sectional shape of second lug 264 may have various differences. For example, the respective cross-sectional shapes of first and second lugs 262, 264 may have any suitable combination of different heights, widths, lengths, shapes, etc. As an example, as shown in FIGS. 5 and 6, the cross-sectional shape of first lug 262 has a height H1 (FIG. 5), e.g., along the axial direction A, and the cross-sectional shape of the second lug 264 also has a height H2 (FIG. 6), e.g., along the axial direction A. The height H1 of the first lug 262 is different (e.g., greater or less) than the height H2 of the second lug 264. As another example, as shown in FIGS. 5 and 6, the cross-sectional shape of the first lug 262 has a width W1 (FIG. 5) perpendicular to the axial direction, and the cross-sectional shape of the second lug 264 also has a width W2 (FIG. 6) perpendicular to the axial direction. The width W1 of the first lug 262 is different (e.g., greater or less) than the width W2 of the second lug 264. In certain exemplary embodiments, the width W1 of the first lug 262 may no less than double the width W2 of the second lug 264. As yet another example, as shown in FIG. 7, the first lug 262 extends from housing 230 by a length L1, e.g., along the radial direction R, and the second lug 264 also extends from housing 230 by a length L2, e.g., along the radial direction R. The length L1 of the first lug 262 is different (e.g., greater or less) than the length L2 of the second lug 264. In certain exemplary embodiments, the length L1 of the first lug 262 may no less than one and one-half the length L2 of the second lug 264. Such sizing of first and second lugs 262, 264 may ensure that each of first and second lugs 262, 264 is receivable within only a respective recess of valve body 219 when filter cartridge 220 is mounted to manifold 210. In such a manner, first lug 262 and/or second lug 264 may orient filter cartridge 220 on manifold 210 such that RFID tag 320 is positioned adjacent and/or faces RFID reader 310 when filter cartridge 220 is mounted to manifold 210.

With first and second lugs 262, 264 received within valve body 219, a user may rotate valve body 219 within manifold 210 by rotating filter cartridge 220 to open or close valve body 219 and thereby regulate water flow to filter cartridge 220. As an example, the user may grasp filter cartridge 220 and close valve body 219 by rotating valve body 219 in a first direction within manifold 210, e.g., before removing and replacing filter cartridge 220. Conversely, the user may grasp the replacement filter cartridge 220 and open valve body 219 by rotating valve body 219 in a second, opposite direction within manifold 210, e.g., to allow water flow through the replacement filter cartridge 220.

As shown in FIG. 5, first lug 262 may have a first projection 266 and a second projection 268. First and second projections 266, 268 of first lug 262 are separate from each other on housing 230. Thus, first and second projections 266, 268 of first lug 262 may be spaced apart and not contact each other at neck 260 of housing 230. First and second projections 266, 268 of first lug 262 may have different shapes and/or cross-sections in a plane that is perpendicular to the radial direction R. For example, first projection 266 of first lug 262 may be a linear or straight projection that extends, e.g., vertically, along the axial direction A on housing 230. Conversely, second projection 268 of first lug 262 may be a curved or non-linear projection and may be positioned adjacent first projection 266 of first lug 262 on housing 230. As shown in FIG. 6, second lug 264 may also have a first projection 266 and a second projection 268.

As shown in FIG. 7, first and second lugs 262, 264 may be positioned opposite each other, e.g., about neck 260, on housing 230, in certain exemplary embodiments. In particular, first and second lugs 262, 264 may be spaced apart from each other by about one hundred and eighty degrees (180°) and extend opposite each other along the radial direction R from housing 230. In alternative exemplary embodiments, first and second lugs 262, 264 may be spaced apart by less than one hundred and eighty degrees (180°) on housing 230. For example, first and second lugs 262, 264 may be spaced apart by between thirty degrees (30°) and one hundred and fifty degrees (150°) on housing 230. When first and second lugs 262, 264 are spaced apart by less than one hundred and eighty degrees (180°) on housing 230, first and second lugs 262, 264 may have common cross-section areas, e.g., because the non-symmetric distribution of first and second lugs 262, 264 on housing 230 ensures that each of first and second lugs 262, 264 is receivable within only a respective recess of valve body 219 when filter cartridge 220 is mounted to manifold 210.

Although shown with first and second lugs 262, 264 in the exemplary embodiment shown in FIGS. 4 through 7, filter cartridge 220 may have only one of first and second lugs 262, 264 in alternative exemplary embodiments. The one of first and second lugs 262, 264 facilitates orientation of housing 230 in only the single orientation when filter cartridge 220 is mounted to manifold 210 because the one of first and second lugs 262, 264 is received within a single recess of valve body 219 in only the single orientation.

Water filtering assembly 200 also includes features for assisting replacement of filter cartridge 220. In particular, filter cartridge 220 includes features for hindering spilling of water contained within filter cartridge 220 during removal or replacement of filter cartridge 220 from water filtering assembly 200. FIG. 9 provides a partial, perspective view of neck 260 of filter cartridge 220 with sleeve 240 received within neck 260. As discussed in greater detail below, sleeve 240 includes features that hinder spilling of water contained within filter cartridge 220 during removal or replacement of filter cartridge 220.

Figure 12:
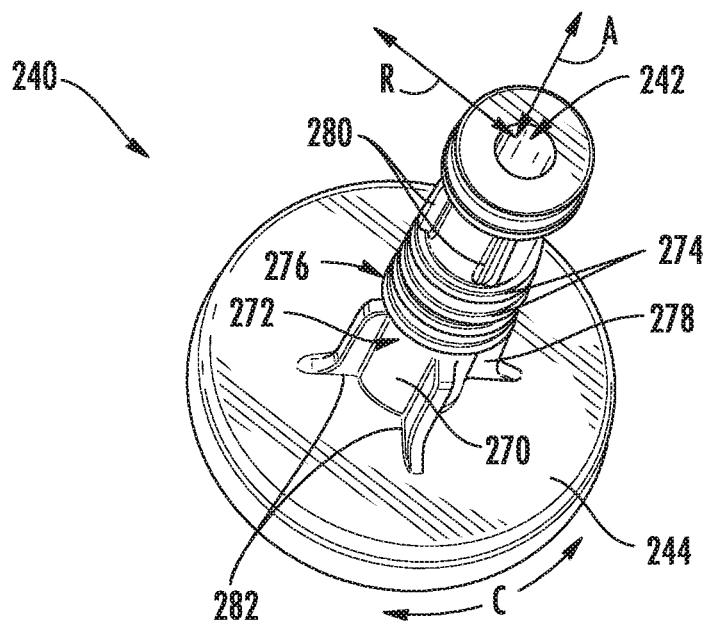
FIG. 12 provides a perspective view of the sleeve of FIG. 10.

FIG. 10 provides an elevation view of sleeve 240. FIG. 11 provides a top, plan view of sleeve 240. FIG. 12 provides a perspective view of sleeve 240. As shown in FIGS. 10 and 12, sleeve 240 includes a post 270 and at least one annular ring 274. In the exemplary embodiment shown in FIGS. 10 and 12, sleeve 240 includes four annular rings. However, sleeve 240 may have any suitable number of annular rings in alternative exemplary embodiments, e.g., one, two, three, five or more annular rings.

As may be seen in FIG. 9, sleeve 240 is disposed within housing 230 at neck 260, e.g., such that sleeve 240 extends from filter medium 232 within chamber 231 of housing 230 to a distal end that is outside of housing 230. Annular rings 274 may extend from post 270, e.g., along the radial direction R. In particular, an outer (e.g., outermost along the radial direction R) of annular rings 274 is spaced apart from an inner surface 234 of housing 230 along the radial direction R by a first gap 61. Similarly, an outer surface 272 of post 270 adjacent or proximate annular rings 274 is spaced apart from inner surface 234 of housing 230 along the radial direction R by a second gap 62.

The sizing of the first gap 61 and the second gap 62 may be selected to hinder spilling of water contained within filter cartridge 220 during removal or replacement of filter cartridge 220. For example, the first gap 61 may be smaller than the second gap 62. In particular, the first gap 61 may be no greater than fifty thousandths of an inch, in certain exemplary embodiments. Thus, a small radial gap may be defined between housing 230 and annular rings 274, e.g., such that the surface tension of water within the small radial gap hinders water flow out of filter cartridge 220 when the water is not pressurized. As may be seen in FIG. 10, annular rings 274 are spaced from one another, e.g., along the axial direction A, on post 270. Thus, multiple small radial gaps may be formed between housing 230 and annular rings 274 to limit water flow out of filter cartridge 220.

Post 270 may assist with forming inlet 241 and outlet 242 of filter cartridge 220. As will be understood from FIGS. 9 and 10, inlet 241 may be defined collectively by inner surface 234 of housing 230, outer surface 276 of annular rings 274 and outer surface 272 of post 270. Cap 244 is positioned on filter medium 232 within housing 230, and post 270 extends, e.g., along the axial direction A, away from cap 244. Post 270 may define outlet 242 such that outlet 242 extends within post 270 along the axial direction A within post 270, e.g., from cap 244 to a distal end of post 270 outside of housing 230. It should be understood that fluid flow through filter cartridge 220 may be revered in certain exemplary embodiments, such that unfiltered water enters filter cartridge 220 at outlet 242 while filtered water exits filter cartridge 220 at inlet 241.

Sleeve 240 may also include a plurality of ribs 278. Ribs 278 extend from post 270, e.g., along the radial direction R, to inner surface 234 of housing 230. Thus, ribs 278 extend between inner surface 234 of housing 230 and post 270, e.g., in order to assist with centering post 270 within neck 260. Ribs 278 may be spaced apart from one another, e.g., on the circumferential direction C, on post 270 such that inlet 241 is divided into segments by ribs 278. Ribs 278 may also extend longitudinally along the axial direction A on post 270. Thus, e.g., ribs 278 may be vertically oriented. Each rib of ribs 278 may have a first portion 280 and a second portion 282. First and second portions 280, 282 of ribs 278 may be spaced apart along the axial direction A. In addition, annular rings 274 may be positioned between first and second portions 280, 282 of ribs 278 along the axial direction A.

Annular rings 274 may be formed separately from post 270 and then adhered, fastened, welded, etc. to post 270 in certain exemplary embodiments. In other exemplary embodiments, as shown in FIGS. 10 and 12, annular rings 274 may be integrally formed with post 270. For example, annular rings 274 and post 270 may be formed from a common material, such as injection molded or additively formed plastic. Thus, post 270 and annular rings 274 may be formed from a seamless one-piece material in exemplary embodiments.

In other exemplary embodiments, annular rings 274 may be mounted to of integrally formed with housing 230 rather than post 270. For example, annular rings 274 may be formed separately from housing 230 and then adhered, fastened, welded, etc. to housing 230. As another example, annular rings 274 may be integrally formed with housing 230. In particular, annular rings 274 and housing 230 may be formed from a common material, such as injection molded or additively formed plastic. Thus, housing 230 and annular rings 274 may be formed from a seamless one-piece material in exemplary embodiments. Post 270 may be inserted into housing 230 at neck 260 to form the small radial gap discussed above and thereby limit water leakage from filter cartridge 220.

Figure 13:
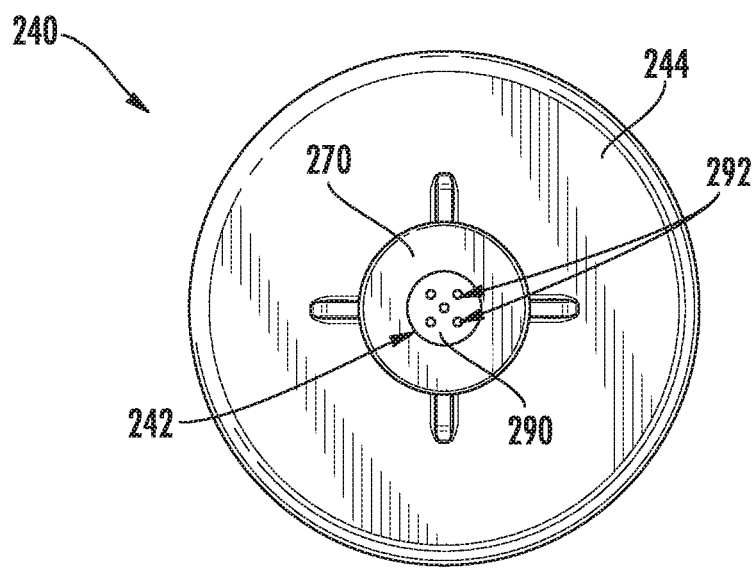
FIG. 13 provides a top, plan view of a sleeve according to another exemplary embodiment of the present subject matter.

FIG. 13 provides a top, plan view of sleeve 240. As may be seen in FIG. 13, sleeve 240 may include a flow restriction body 290 positioned within outlet 242. Flow restriction body 290 extends across outlet 242, e.g., along the radial direction R, and defines at least one hole 292. In the exemplary embodiment shown in FIG. 13, flow restriction body 290 includes five holes. However, flow restriction body 290 may have any suitable number of holes in alternative exemplary embodiments, e.g., one, two, three, four, six or more holes. Holes 292 direct water through flow restriction body 290.

Flow restriction body 290 may be formed separately from post 270 and then adhered, fastened, welded, etc. to post 270 within outlet 242 in certain exemplary embodiments. In other exemplary embodiments, as shown in FIG. 13, flow restriction body 290 may be integrally formed with post 270. For example, post 270 and flow restriction body 290 may be formed from a common material, such as injection molded or additively formed plastic. Thus, post 270 and flow restriction body 290 may be formed from a seamless one-piece material in exemplary embodiments Each hole of holes 292 has a width, e.g., along the radial direction R. In the exemplary embodiment shown in FIG. 13, holes 292 are circular, and the width of holes 292 corresponds to the circumference of holes 292. The sizing of the width of holes 292 may be selected to hinder spilling of water contained within filter cartridge 220 during removal or replacement of filter cartridge 220. For example, the width of holes 292 may be no greater than fifty thousandths of an inch, in certain exemplary embodiments. Thus, the small radial diameter of holes 292 may allow the surface tension of water within holes 292 to hinder water flow out of filter cartridge 220 when the water is not pressurized. As may be seen in FIG. 10, holes 292 are spaced from one another, e.g., along the radial direction R, on flow restriction body 290. Flow restriction body 290 may be used in addition to or in lieu of annular rings 274 to limit spilling of water contained within filter cartridge 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter cartridge, comprising:
   a casing extending between a first end portion and a second end portion along an axial direction, the casing having a port positioned at the first end portion of the casing;
   a filter medium disposed within the casing; and
   a sleeve disposed within the port of the casing, the sleeve comprising a post and an annular ring, the annular ring of the sleeve extending from the post of the sleeve along a radial direction that is perpendicular to the axial direction, an outer surface of the annular ring spaced apart from an inner surface of the casing along the radial direction by a first gap, an outer surface of the post adjacent the annular ring spaced apart from the inner surface of the casing along the radial direction by a second gap, the first gap being smaller than the second gap,
   wherein a passage is defined by an inner surface of the casing, the outer surface of the annular ring and the outer surface of the post, the passage is configured such that fluid is flowable along the axial direction through the passage, and the annular ring of the sleeve is imperforate.

2. The filter cartridge of claim 1, wherein the first gap is no greater than fifty thousandths of an inch.

3. The filter cartridge of claim 1, wherein the sleeve further comprises at least one additional annular ring, each annular ring of the at least one additional annular ring extending from the post of the sleeve along the radial direction, the annular ring and each annular ring of the at least one additional annular ring spaced from one another along the axial direction on the post of the sleeve.

4. The filter cartridge of claim 3, wherein the at least one additional annular ring comprises at least three additional annular rings.

5. The filter cartridge of claim 3, wherein an outer surface of each annular ring of the at least one additional annular ring is spaced apart from the inner surface of the casing along the radial direction.

6. The filter cartridge of claim 1, wherein the sleeve further comprises a plurality of ribs extending from the post of the sleeve along the radial direction, each rib of the plurality of ribs extending to the inner surface of the casing.

7. The filter cartridge of claim 6, wherein the ribs of the plurality of ribs are circumferentially spaced apart from one another on the post of the sleeve.

8. The filter cartridge of claim 6, wherein the ribs of the plurality of ribs extend longitudinally along the axial direction on the post of the sleeve.

9. The filter cartridge of claim 6, wherein each rib of the plurality of ribs has a first portion and a second portion that are spaced apart along the axial direction, the annular ring of the sleeve positioned between the first and second portions of the ribs of the plurality of ribs along the axial direction.

10. The filter cartridge of claim 1, wherein the passage is an inlet.

11. The filter cartridge of claim 10, wherein the post of the sleeve defines an outlet that extends within the post along the axial direction.

12. The filter cartridge of claim 1, wherein the sleeve further comprises a cap positioned on the filter medium within the casing, the post of the sleeve extending along the axial direction from the rap of the sleeve.

13. The filter cartridge of claim 12, wherein the filter medium is an activated carbon block.

14. A filter cartridge, comprising:
    a casing extending between a first end portion and a second end portion along an axial direction, the casing having a port positioned at the first end portion of the casing; a filter medium disposed within the casing;
    a sleeve disposed within the port of the casing, the sleeve comprising a post and a cap, the cap positioned on the filter medium within the casing, the post of the sleeve extending along the axial direction from the cap of the sleeve; and
    an annular ring disposed within the port of the casing, the annular ring extending along a radial direction that is perpendicular to the axial direction, an outer surface of the annular ring spaced apart from an inner surface of the casing or an outer surface of the post along the radial direction by a gap, the gap being no greater than fifty thousandths of an inch,
    wherein a passage is defined by an inner, surface of the casing, the outer or inner surface of the annular ring and the outer surface of the post, the passage is configured such that fluid is flowable along the axial direction through the passage, and the annular ring is imperforate.

15. The filter cartridge of claim 14, further comprising at least one additional annular ring, each annular ring of the at least one additional annular ring extending along the radial direction, the annular ring and each annular ring of the at least one additional annular ring spaced from one another along the axial direction, an outer surface of each annular ring of the at least one additional annular ring spaced apart from the inner surface of the casing or the outer surface of the post along the radial direction.

16. The filter cartridge of claim 14, wherein the sleeve further comprises a plurality of ribs extending from the post of the sleeve along the radial direction, each rib of the plurality of ribs extending to the inner surface of the casing, the ribs of the plurality of ribs circumferentially spaced apart from one another on the post of the sleeve.

17. The filter cartridge of claim 14, wherein the passage is an inlet.

18. The filter cartridge of claim 17, wherein the post of the sleeve defines an outlet that extends within the post along the axial direction.

19. The filter cartridge of claim 14, wherein the annular ring is integrally formed with one of the casing and the post.

\* \* \* \* \*

UNITED STATES PATENT AND TRADEMARK OFFICE
CERTIFICATE OF CORRECTION

PATENT NO.        : 10,099,162 B2
APPLICATION NO.   : 15/252296
DATED             : October 16, 2018
INVENTOR(S)       : Ryan John Prince et al.

Page 1 of 1

It is certified that error appears in the above-identified patent and that said Letters Patent is hereby corrected as shown below:

In the Claims

Claim 12: In Column 14, Line 22 - "rap" should read "cap".

Signed and Sealed this
Fourth Day of December, 2018

Andrei Iancu
*Director of the United States Patent and Trademark Office*